(12) United States Patent
Hirota et al.

(10) Patent No.: US 11,241,666 B2
(45) Date of Patent: Feb. 8, 2022

(54) REACTOR AND PRODUCTION METHOD OF TRICHLOROSILANE

(71) Applicant: TOKUYAMA CORPORATION, Yamaguchi (JP)

(72) Inventors: Kenji Hirota, Yamaguchi (JP); Katsuya Ogihara, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 16/756,042

(22) PCT Filed: Nov. 16, 2018

(86) PCT No.: PCT/JP2018/042559
§ 371 (c)(1),
(2) Date: Apr. 14, 2020

(87) PCT Pub. No.: WO2019/098347
PCT Pub. Date: May 23, 2019

(65) Prior Publication Data
US 2020/0306714 A1    Oct. 1, 2020

(30) Foreign Application Priority Data

Nov. 20, 2017  (JP) .............................. JP2017-223142

(51) Int. Cl.
*B01J 8/24* (2006.01)
*B01J 8/18* (2006.01)
(Continued)

(52) U.S. Cl.
CPC ............... *B01J 8/24* (2013.01); *B01J 8/1836* (2013.01); *B01J 19/02* (2013.01); *C01B 33/107* (2013.01);
(Continued)

(58) Field of Classification Search
CPC ... B01J 8/24; B01J 8/1836; B01J 19/02; B01J 2208/00398; B01J 2208/00796; B01J 2219/0277; C01B 33/107; C01B 33/1071
(Continued)

(56) References Cited

U.S. PATENT DOCUMENTS 3,898,043 A *  8/1975  Schutte ................... C01F 7/308
                                             422/140
3,983,927 A   10/1976  Steever et al.
(Continued)

FOREIGN PATENT DOCUMENTS

EP       2210661      7/2010
JP       2009-120467  6/2009
(Continued)

OTHER PUBLICATIONS

International Preliminary Report on Patentability for PCT/JP2018/04255, dated May 26, 2020, 7 pages.
(Continued)

*Primary Examiner* — Huy Tram Nguyen
(74) *Attorney, Agent, or Firm* — Casimir Jones, S.C.; Brian F. Bradley

(57) ABSTRACT

An object of the present invention is to prevent stress-corrosion cracking of a header (40) of a reactor. A reactor for producing trichlorosilane by causing metal silicon powder and a hydrogen chloride gas to react with each other includes a cooler (70), the cooler including a plurality of heat transfer medium pipes (30) and a header (40), the plurality of heat transfer medium pipes being provided in a fluid bed (60) inside the reactor, the header being provided in a freeboard section (50) inside the reactor, the header being comprised of a corrosion-resistant material.

4 Claims, 1 Drawing Sheet

(51) Int. Cl.
  *B01J 19/02* (2006.01)
  *C01B 33/107* (2006.01)
(52) U.S. Cl.
  CPC ............... *B01J 2208/00398* (2013.01); *B01J 2208/00796* (2013.01); *B01J 2219/0277* (2013.01)
(58) Field of Classification Search
  USPC ........................................................ 422/198
  See application file for complete search history.

(56) References Cited

U.S. PATENT DOCUMENTS

| | | | |
|---|---|---|---|
| 4,176,710 A | | 12/1979 | Freudlsperger et al. |
| 5,565,393 A | * | 10/1996 | Felix ................. B01J 19/02 422/241 |
| 2004/0047794 A1 | * | 3/2004 | Pfaffelhuber ............ B01J 19/02 423/342 |
| 2009/0104104 A1 | | 4/2009 | Inaba |
| 2009/0238748 A1 | | 9/2009 | Kitagawa |
| 2010/0183496 A1 | | 7/2010 | Narukawa |
| 2010/0264362 A1 | * | 10/2010 | Chee ..................... B01J 8/0055 252/182.1 |

FOREIGN PATENT DOCUMENTS

| | | |
|---|---|---|
| JP | 2009-256197 | 11/2009 |
| JP | 2010-189256 | 9/2010 |
| JP | 2011-063480 | 3/2011 |
| JP | 2011-184243 | 9/2011 |
| JP | 2013-023398 | 2/2013 |

OTHER PUBLICATIONS

International Search Report for PCT/JP2018/042559, dated Dec. 11, 2018, 2 pages.
The Extended European Search Report for EP Application No. 18878112.4, dated Jun. 29, 2021, 9 pages.

* cited by examiner

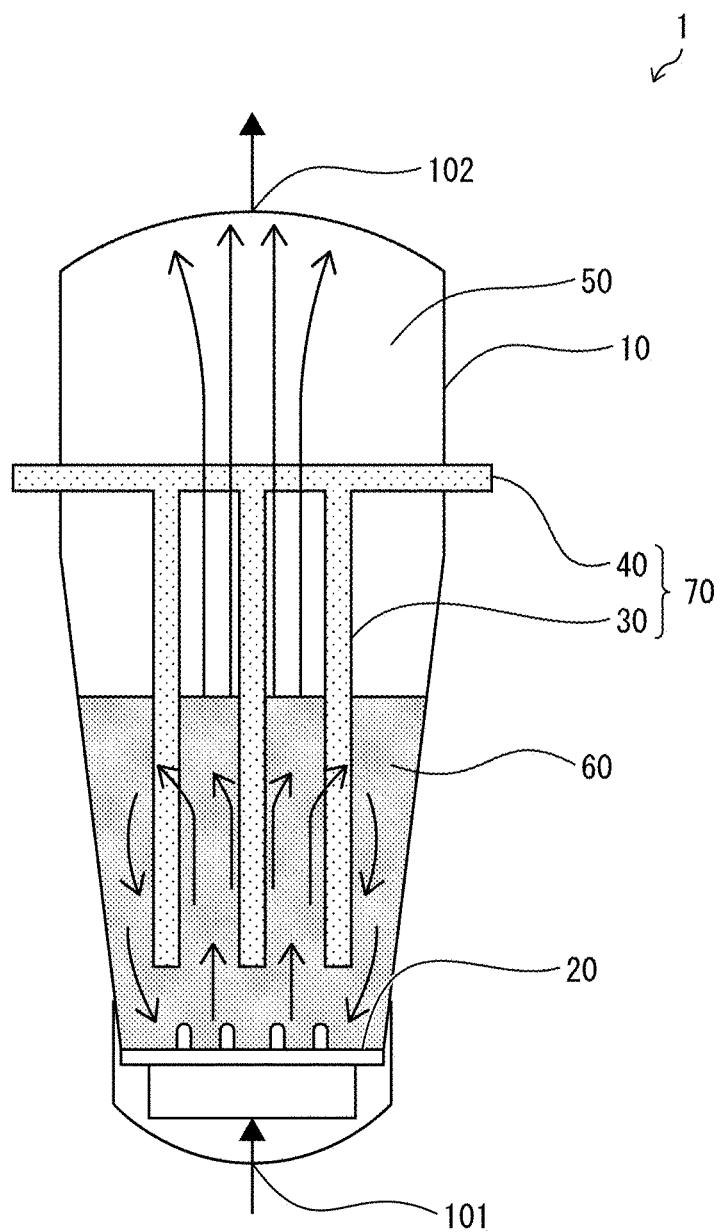

REACTOR AND PRODUCTION METHOD OF TRICHLOROSILANE

TECHNICAL FIELD

The present invention relates to a reactor and a method for producing trichlorosilane.

BACKGROUND ART

Trichlorosilane is produced by means such as, for example, a fluidized-bed reactor. In a fluid bed in the fluidized-bed reactor, metal silicon powder and a hydrogen chloride gas, which are raw materials for trichlorosilane, are caused to react with each other to produce trichlorosilane. The fluidized-bed reactor is provided with a member for reducing a temperature in the fluidized-bed reactor during a trichlorosilane production reaction. However, since the metal silicon powder is a very hard substance, a portion of the member which portion is in contact with the fluid bed may wear away. In order to solve this problem, for example, Patent Literature 1 discloses a technique of providing a wear preventing means on a surface of the portion that is in contact with the metal silicon powder (in other words, the fluid bed).

CITATION LIST

Patent Literature

[Patent Literature 1]
Japanese Patent Application Publication Tokukai No. 2011-184243

SUMMARY OF INVENTION

Technical Problem

However, in order to prevent damage to the fluidized-bed reactor, it is not sufficient to consider only damage resulting from wearing of the portion that is in contact with the fluid bed, i.e., damage that can be predicted to occur during production of trichlorosilane. That is, as described later, the inventors of the present invention found, through their own study, that in a case where (i) corrosion of the portion (especially, a header) that is not in contact with the metal silicon powder progresses and (ii) the production of trichlorosilane is continued in a state where the corrosion of the header has progressed, the corroded portion cracks due to thermal stress applied to the corroded portion when the trichlorosilane production reaction increases the temperature in the reactor.

Accordingly, it is an object of an aspect of the present invention to prevent corrosion cracking, resulting from stress (hereinafter referred to as "stress-corrosion cracking"), of a header of a reactor.

Solution to Problem

In order to attain the object, the inventors of the present invention conducted diligent research, and found that the stress-corrosion cracking is preventable by employing a corrosion-resistant material as a material for the header which is not in contact with the metal silicon powder. Specifically, the present invention includes the following configurations.

A reactor for producing trichlorosilane by causing metal silicon powder and a hydrogen chloride gas to react with each other, including a cooler, the cooler including a plurality of heat transfer medium pipes and a header connected to the plurality of heat transfer medium pipes, the plurality of heat transfer medium pipes being provided in a fluid bed inside the reactor, the header being provided in a freeboard section inside the reactor, the header being comprised of a corrosion-resistant material.

Advantageous Effects of Invention

The present invention makes it possible to prevent stress-corrosion cracking of a header of a reactor.

BRIEF DESCRIPTION OF DRAWINGS

FIG. 1 is a view schematically illustrating an internal structure of a fluidized-bed reactor in accordance with an embodiment of the present invention.

DESCRIPTION OF EMBODIMENTS

The following description will discuss embodiments of the present invention in detail. Note that any numerical range expressed as "A to B", in this specification, means "not less than A and not more than B (between A and B inclusive)", unless otherwise specified.

1. Overview of the Present Invention

In a fluidized-bed reactor for producing trichlorosilane, a raw material gas (a hydrogen chloride gas) supplied from a lower part of the reactor causes metal silicon powder to flow, so that a fluid bed is formed. Note here that in order to control a temperature during a trichlorosilane production reaction, the reactor includes a cooler including (i) a plurality of heat transfer medium pipes and (ii) a header connected to the heat transfer medium pipes. The heat transfer medium pipes of the cooler provided in the reactor are present inside the fluid bed, and the metal silicon powder is in contact with surfaces of the heat transfer medium pipes. As such, generally, those skilled in the art are especially concerned about wearing of a portion of the heat transfer medium pipes which portion is in contact with the fluid bed. However, the inventors of the present invention found, through their own diligent study, that the following problems may occur inside the fluidized-bed reactor, in addition to wear of the heat transfer medium pipes resulting from being in contact with the metal silicon powder in the fluid bed. That is, the inventors of the present invention obtained the following knowledge: (i) when the fluidized-bed reactor is opened for regular inspection or the like, a hydrochloric acid environment is formed due to moisture in the air; (ii) the hydrochloric acid environment accelerates corrosion of a portion (especially, the header) that is not in contact with the metal silicon powder, not of a portion that is in contact with the metal silicon powder in the fluid bed; and (iii) in a case where production of trichlorosilane is continued in a state where the corrosion of the header has progressed, the corroded portion undergoes stress-corrosion cracking due to thermal stress applied to the corroded portion when a trichlorosilane production reaction increases the temperature in the reactor.

Then, the inventors of the present invention found that the stress-corrosion cracking of the header, which occurs as a result of the above-described phenomenon, is preventable by employing a corrosion-resistant material as a material for the header.

2. Method for Producing Trichlorosilane and Reactor

A reactor in accordance with an embodiment of the present invention is a reactor for producing trichlorosilane by causing metal silicon powder and a hydrogen chloride gas to react with each other, including a cooler, the cooler including a plurality of heat transfer medium pipes and a header connected to the plurality of heat transfer medium pipes, the plurality of heat transfer medium pipes being provided in a fluid bed inside the reactor, the header being provided in a freeboard section inside the reactor, the header being comprised of a corrosion-resistant material. A method for producing trichlorosilane in accordance with an embodiment of the present invention is a method for producing trichlorosilane, including the step of producing trichlorosilane with use of the above reactor.

The method for producing trichlorosilane and the reactor are outlined below. Trichlorosilane ($SiHCl_3$) can be produced by causing metal silicon powder and a hydrogen chloride gas (HCl) to react with each other. Trichlorosilane can be produced with use of a fluidized-bed reactor 1.

FIG. 1 is a view schematically illustrating an internal structure of the fluidized-bed reactor 1. The fluidized-bed reactor 1 includes a reaction vessel 10, a distributor plate 20, and a cooler 70. The fluidized-bed reactor 1 is configured such that metal silicon powder is supplied into the reaction vessel 10 and that a hydrogen chloride gas, which is to react with the metal silicon powder, is supplied into the reaction vessel 10 through a gas feed opening 101 provided at a bottom part of the reaction vessel 10. The distributor plate 20 is provided within the reaction vessel 10 so as to reside above the gas feed opening 101, and serves to disperse the hydrogen chloride gas supplied into the reaction vessel 10.

The fluidized-bed reactor 1 allows the metal silicon powder inside the reaction vessel 10 to react with the hydrogen chloride gas, while allowing the metal silicon powder to flow by the hydrogen chloride gas (an area where this reaction is taking place is hereinafter referred to as "fluid bed 60"). Trichlorosilane produced by the reaction between the metal silicon powder and the hydrogen chloride gas is taken out through an outlet 102 of the reaction vessel 10. The cooler 70 includes a plurality of heat transfer medium pipes 30 and a header 40. The plurality of heat transfer medium pipes 30 are provided in parallel to a vertical direction (direction of gravitational force). The header 40 is located in a freeboard section 50, which is an upper space of the reaction vessel 10.

The plurality of heat transfer medium pipes 30 are pipes through each of which a heating medium passes. The header 40 is a pipe (that is, a pipe branching into the plurality of heat transfer medium pipes 30) connected to the plurality of heat transfer medium pipes 30. The header 40 distributes a heating medium to the plurality of heat transfer medium pipes 30 so as to let the heating medium circulate in the plurality of heat transfer medium pipes 30. The header 40 communicates with an outside of the reaction vessel 10, and thus is capable of supplying the heating medium to the plurality of heat transfer medium pipes 30 in the reaction vessel 10. The heat transfer medium is passed through an inside of the cooler 70, so that reaction heat resulting from the reaction between the metal silicon powder and the hydrogen chloride gas in the fluid bed 60 is removed.

Note that flows of the metal silicon powder and the hydrogen chloride gas to the fluidized-bed reactor 1 are not described here, since descriptions thereof are provided in, for example, Japanese Patent Application Publication Tokukai No. 2011-184242, which can be incorporated herein as necessary. Note that a flow of trichlorosilane which has been taken out of the fluidized-bed reactor 1 is not described here, since, descriptions thereof are provided in, for example, Japanese Patent Application Publication Tokukai No. 2015-089859, which can be incorporated herein as necessary.

As used herein, the term "metal silicon powder" refers to a solid substance that contains elemental silicon in metal form, such as metallurgical grade silicon, ferrosilicon, or polysilicon. Any of known such materials may be used without any limitation. These kinds of metal silicon powder may contain some impurity(impurities) such as an iron compound. The constituents and amounts of such impurities are not particularly limited. Usually, the metal silicon powder is used in the form of fine powder having an average particle diameter of about 150 μm to 350 μm.

The hydrogen chloride for use in the foregoing reaction can be any of various kinds of industrially available hydrogen chloride.

Also note that, with regard to the fluidized-bed reactor to be used for the foregoing reaction, any of known fluidized-bed reactors can be used without any particular limitation. The use of a fluidized-bed reactor makes it possible to continuously supply metal silicon powder and hydrogen chloride and thereby produce trichlorosilane. The amount of supply of the metal silicon powder and the hydrogen chloride is not particularly limited, provided that the metal silicon powder and the hydrogen chloride can be supplied at a speed that achieves a flow rate at which a fluid bed can form.

The shape of the reaction vessel 10 (in other words, the shape of a side wall of the reaction vessel 10) is not particularly limited. For example, a portion, which surrounds the fluid bed 60, of the side wall of the reaction vessel 10 may be (i) shaped such that its cross section perpendicular to a height direction of the reaction vessel 10 is uniform in area (not illustrated) or (ii) may be tapered such that its cross section perpendicular to the height direction of the reaction vessel 10 increases in area in an upward direction (FIG. 1). For example, the side wall may be tapered such that the tapered portion, whose cross section perpendicular to the height direction of the reaction vessel increases in area in the upward direction, occupies at least 80% of a distance from the gas feed opening to a top face of the fluid bed. Of the reaction vessel 10, the side wall surrounding the fluid bed 60 has a shape which is preferably a tapered shape, because this makes it possible to reduce the risk of erosion and to prevent local temperature increases.

The temperature at which the foregoing reaction is carried out is selected appropriately in consideration of the material or capacity of the reactor, and the like. Generally, the temperature at which the reaction is carried out is set to fall within the range of from 200° C. to 500° C., particularly within the range of from 250° C. to 400° C.

3. Cooler

As described above, the cooler 70 includes the plurality of heat transfer medium pipes 30 and the header 40. The following description will further discuss the cooler 70.

As illustrated in FIG. 1, the plurality of heat transfer medium pipes 30 may be provided so as to be parallel to each other. The number of the plurality of heat transfer medium pipes 30 may be determined as appropriate in accordance with the size of the reaction vessel, and may be 20 to 60, for example. The plurality of heat transfer medium pipes 30 may each be a double pipe.

The heat transfer medium is not particularly limited, provided that it is capable of cooling the foregoing reaction heat at a desired cooling rate. Examples of the heat transfer medium include nitrogen gas, water, air, and the like. In a case where the heat transfer medium is liquid, a boiling point of the heat transfer medium is preferably not lower than 300° C., from the viewpoint of reducing a diameter of each of the plurality of heat transfer medium pipes 30.

The header 40 is comprised of a corrosion-resistant material. With such a configuration, it is possible to prevent stress-corrosion cracking of the header 40. It is thus possible to provide a method for producing trichlorosilane which method allows continuously conducting a trichlorosilane production reaction without having to consider the risk of stress-corrosion cracking of the header of the cooler 70. As used herein, the term "corrosion-resistant material" refers to a material that has been verified by JIS G0576 "stress corrosion cracking test for stainless steels" or JIS Z 2291 "method for high-temperature gaseous corrosion test of metallic materials" to be less prone to stress-corrosion cracking than stainless steel or to be very highly resistant to oxidation at high temperature. As used herein, the scope of the meaning of the phrase "(a member is) comprised of a corrosion-resistant material" includes, for example, (i) the member coated with a corrosion-resistant material and (ii) the member produced from a corrosion-resistant material by forging or casting.

The corrosion-resistant material preferably contains at least nickel, more preferably contains at least chromium, nickel, and iron. With such a configuration, the cooler 70 (in other words, the header 40) exhibits more excellent corrosion resistance.

Examples of the amount of each element in 100 wt. % of the corrosion-resistant material are given below. The amount of chromium is preferably 10 wt. % to 25 wt. %, more preferably 14 wt. % to 23 wt. %. The amount of nickel is preferably 50 wt. % to 80 wt. %, more preferably 55 wt. % to 76 wt. %. The amount of iron is preferably 2 wt. % to 10 wt. %, more preferably 3 wt. % to 8 wt. %. Chromium, nickel, and iron may each be an industrially available one.

The corrosion-resistant material may be made of chromium, nickel and iron, or may contain an element other than the foregoing elements. Examples of the element other than the foregoing elements include molybdenum and tungsten. The amount of molybdenum in 100 wt. % of the corrosion-resistant material is preferably 0 wt. % to 20 wt. %, more preferably 5 wt. % to 17 wt. %. The amount of tungsten is preferably 0 wt. % to 5 wt. %, more preferably 0 wt. % to 4 wt. %.

Further, examples of the element other than the foregoing elements include vanadium, carbon, cobalt, niobium, tantalum, copper, and the like. In a case where the corrosion-resistant material contains these elements, the elements may be mixed in any ratio that allows the header 40 to exhibit excellent corrosion resistance. These elements may each be an industrially available one.

Specific examples of such a corrosion-resistant material include Hastelloy C276, Hastelloy C22, Inconel 625, Inconel 600, and the like. In particular, the corrosion-resistant material is preferably Hastelloy C22 from the viewpoint of corrosion resistance. Note that Hastelloy C276 contains approximately 57 wt. % of nickel, approximately 16 wt. % of chromium, approximately 16 wt. % of molybdenum, approximately 2.5 wt. % of cobalt, approximately 5.0 wt. % of iron, approximately 4.0 wt. % of tungsten, and approximately 0.01 wt. % of carbon. Hastelloy C22 contains approximately 56 wt. % of nickel, approximately 22 wt. % of chromium, approximately 13 wt. % of molybdenum, approximately 2.5 wt. % of cobalt, approximately 3.0 wt. % of iron, approximately 3.0 wt. % of tungsten, and approximately 0.01 wt. % of carbon. Inconel 625 contains approximately 61 wt. % of nickel, approximately 22 wt. % of chromium, approximately 9 wt. % of molybdenum, approximately 4.2 wt. % of iron, and approximately 0.01 wt. % of carbon. Inconel 600 contains approximately 76 wt. % of nickel, approximately 15 wt. % of chromium, approximately 7.6 wt. % of iron, approximately 0.2 wt. % of copper, and approximately 0.02 wt. % of carbon.

The material of each of the plurality of heat transfer medium pipes 30 is not particularly limited, but in consideration of a casting step, it is preferable that each of the plurality of heat transfer medium pipes 30 be made of a material (in other words, a corrosion-resistant material) similar to that of the header 40. With such a configuration, the cooler 70 is obtained through a simple step.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

[1] A reactor for producing trichlorosilane by causing metal silicon powder and a hydrogen chloride gas to react with each other, including a cooler, the cooler including a plurality of heat transfer medium pipes and a header connected to the plurality of heat transfer medium pipes, the plurality of heat transfer medium pipes being provided in a fluid bed inside the reactor, the header being provided in a freeboard section inside the reactor, the header being comprised of a corrosion-resistant material.

[2] The reactor which is configured such that the corrosion-resistant material contains at least chromium, nickel, and iron.

[3] A method for producing trichlorosilane, including the step of producing trichlorosilane with use of a reactor recited in [1] or [2].

EXAMPLES

The following description will discuss a method of the present invention in more detail based on Examples. Note, however, that the present invention is not limited to such Examples.

Example 1

Production of trichlorosilane was conducted by operating, for 330 days, a fluidized-bed reactor including heat transfer medium pipes and a header, each of which was comprised of Hastelloy C276.

Then, the reaction was stopped, the fluidized-bed reactor was opened, and whether or not the heat transfer medium pipes and the header had damage was inspected by visual observation.

Comparative Example 1

In accordance with a procedure similar to Example 1, except for using heat transfer medium pipes and a header each comprised of stainless steel in place of the heat transfer medium pipes and the header each comprised of Hastelloy C276, whether or not the heat transfer medium pipes and the header had damage was inspected by visual observation.

Results

In Example 1, no damage (a pattern indicative of permeation) was found on the heat transfer medium pipes and the header. In Comparative Example 1, damage (a pattern indicative of permeation) was observed on the heat transfer medium pipes and the header.

INDUSTRIAL APPLICABILITY

The present invention is applicable to production of trichlorosilane in a fluidized-bed reactor.

REFERENCE SIGNS LIST

1: Fluidized-bed Reactor
10: Reaction vessel
20: Distributor plate
30: Heat transfer medium pipe
40: Header
50: Freeboard section
60: Fluid bed
70: Cooler
101: Gas feed opening
102: Outlet

The invention claimed is:

1. A reactor for producing trichlorosilane by causing metal silicon powder and a hydrogen chloride gas to react with each other, comprising a cooler,
    the cooler including a plurality of heat transfer medium pipes and a header connected to the plurality of heat transfer medium pipes,
    the plurality of heat transfer medium pipes being provided in a fluid bed inside the reactor,
    the header being provided in a freeboard section inside the reactor,
    the header being comprised of a corrosion-resistant material, the corrosion-resistant material being Hastelloy C276, Hastelloy C22, or Inconel 600.

2. A method for producing trichlorosilane, comprising the step of producing trichlorosilane with use of a reactor recited in claim 1.

3. The reactor of claim 1, wherein the header is not in contact with the fluid bed.

4. The reactor of claim 1, wherein the header is spaced from the fluid bed.

* * * * *